United States Patent
Sue et al.

(10) Patent No.: US 9,546,889 B2
(45) Date of Patent: Jan. 17, 2017

(54) LOCK RACK FOR HYDRO, ISOLATION OR TEST BLINDS

(71) Applicants: Tracy Sue, South Houston, TX (US); Casey Sue, South Houston, TX (US)

(72) Inventors: Tracy Sue, Baytown, TX (US); Casey Sue, Baytown, TX (US)

(73) Assignee: USA Industries, Inc., South Houston, TX (US)

( * ) Notice: Subject to any disclaimer, the term of this patent is extended or adjusted under 35 U.S.C. 154(b) by 0 days.

(21) Appl. No.: 14/699,923

(22) Filed: Apr. 29, 2015

(65) Prior Publication Data

US 2015/0305498 A1     Oct. 29, 2015

Related U.S. Application Data

(60) Provisional application No. 61/985,835, filed on Apr. 29, 2014.

(51) Int. Cl.
| | |
|---|---|
| *G01D 11/30* | (2006.01) |
| *A47B 47/02* | (2006.01) |
| *A47B 81/00* | (2006.01) |
| *B65G 1/02* | (2006.01) |

(52) U.S. Cl.
CPC ............. *G01D 11/30* (2013.01); *A47B 47/027* (2013.01); *A47B 81/00* (2013.01); *B65G 1/02* (2013.01)

(58) Field of Classification Search
CPC ....... A47B 47/021; A47B 47/02; A47B 47/00; A47B 47/022; A47B 47/027; A47B 57/30; A47B 57/402; A47B 57/42; A47B 57/46; A47B 57/54; A47B 57/56; A47F 5/103; A47F 5/101
See application file for complete search history.

(56) References Cited

U.S. PATENT DOCUMENTS

| | | | | |
|---|---|---|---|---|
| 4,955,490 A | * | 9/1990 | Schafer | A47B 96/02 211/187 |
| 5,628,415 A | * | 5/1997 | Mulholland | A47B 47/027 211/186 |
| 5,715,957 A | * | 2/1998 | Merl | A47F 5/10 211/187 |
| 5,794,794 A | * | 8/1998 | Hull | H05K 7/18 211/187 |
| 5,889,648 A | * | 3/1999 | Heavirland | H02B 1/54 174/50 |
| 8,439,207 B2 | * | 5/2013 | Currin | A47F 5/0838 211/106.01 |
| 9,215,930 B2 | * | 12/2015 | Weinkove | A47B 81/00 |
| 2003/0029818 A1 | * | 2/2003 | Kamphuis | A47F 5/04 211/70.6 |
| 2003/0196980 A1 | * | 10/2003 | Ahn | A47F 5/137 211/189 |
| 2015/0359335 A1 | * | 12/2015 | Offerman | A47B 96/021 211/153 |

* cited by examiner

*Primary Examiner* — Brian Glessner
*Assistant Examiner* — Paola Agudelo
(74) *Attorney, Agent, or Firm* — Mark A. Oathout; Oathout Law Firm

(57) ABSTRACT

A blind rack for storing a plurality of blinds has a support frame including a horizontal frame. A plurality of load bearing arms are connected to the horizontal frame, and the plurality of blinds to be stored on the blind rack are indexable with respect to the horizontal frame.

23 Claims, 21 Drawing Sheets

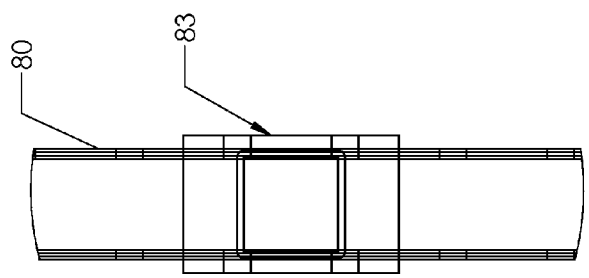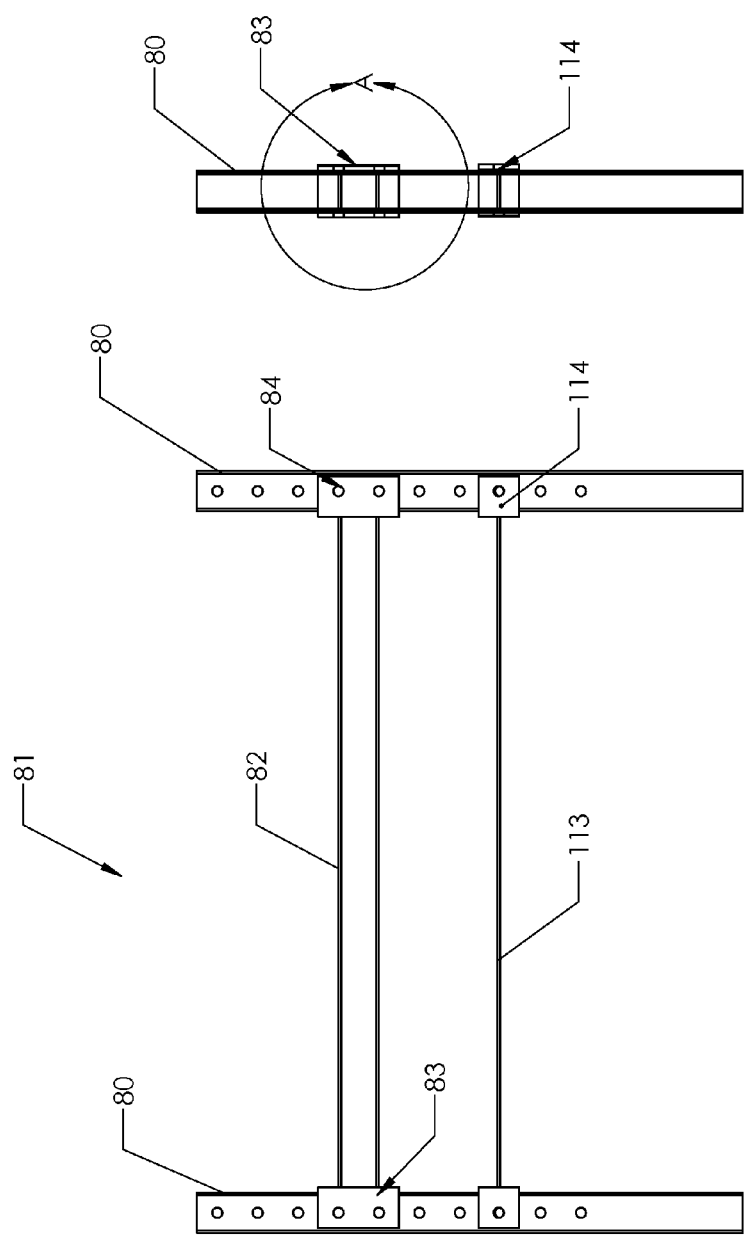

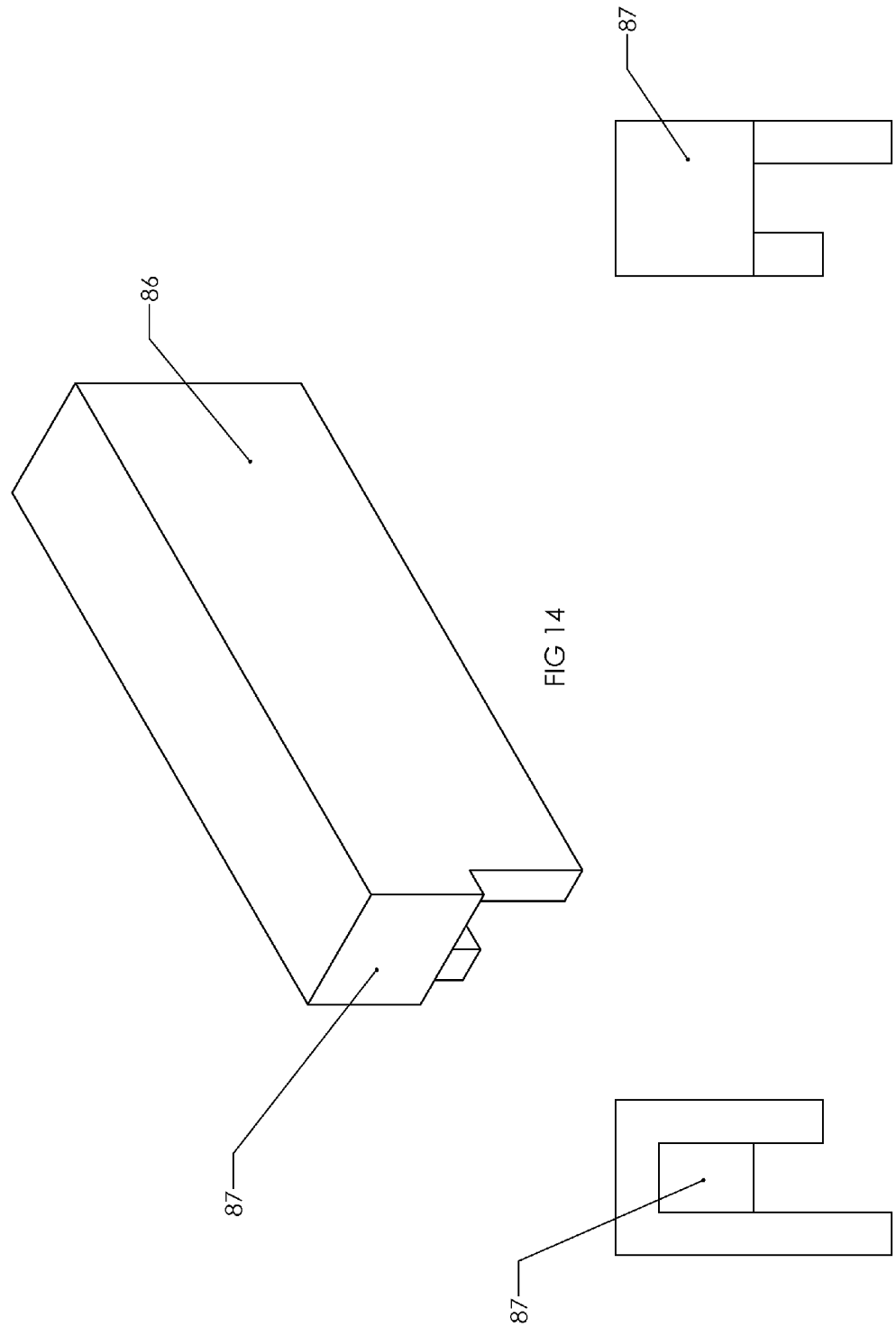

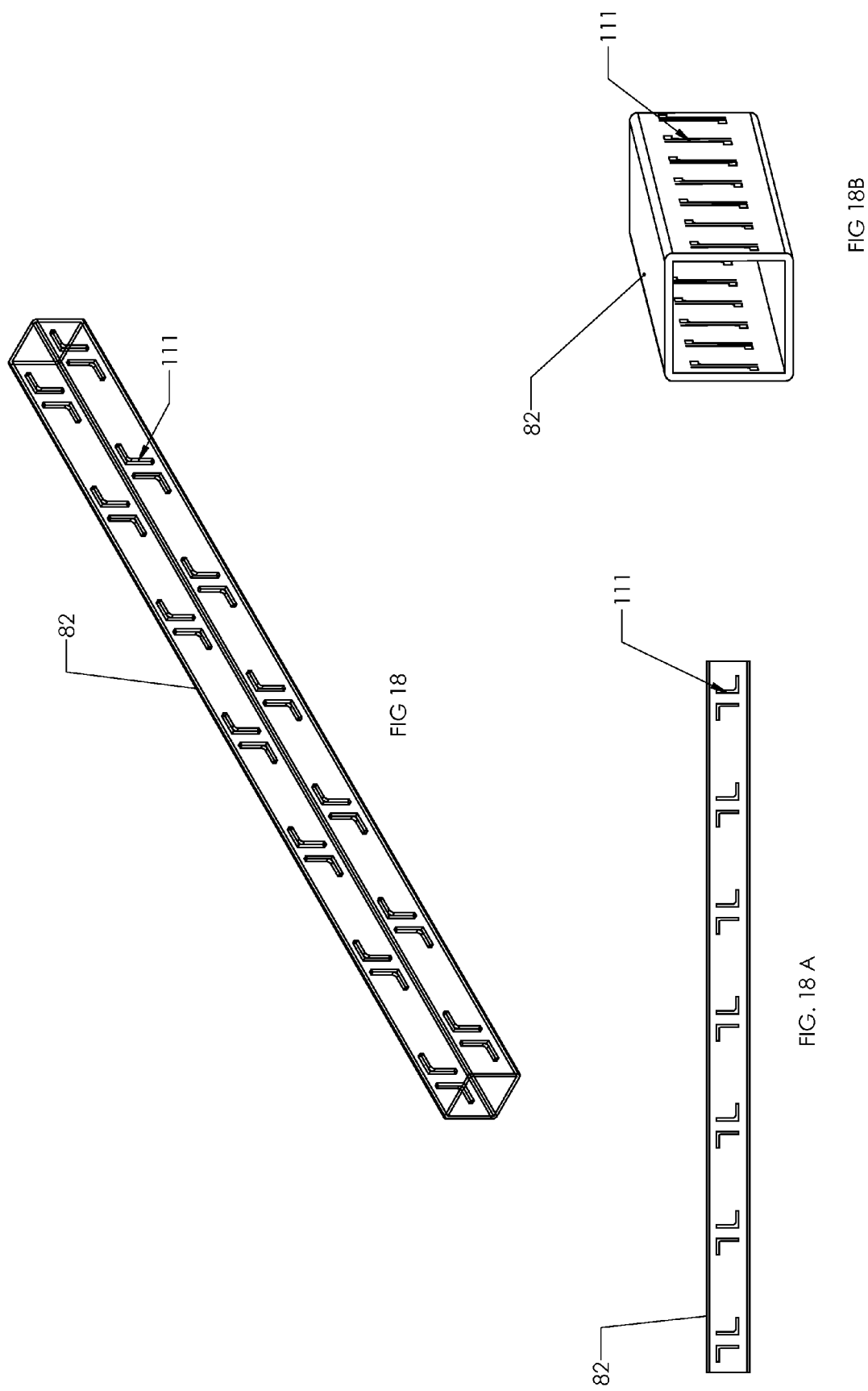

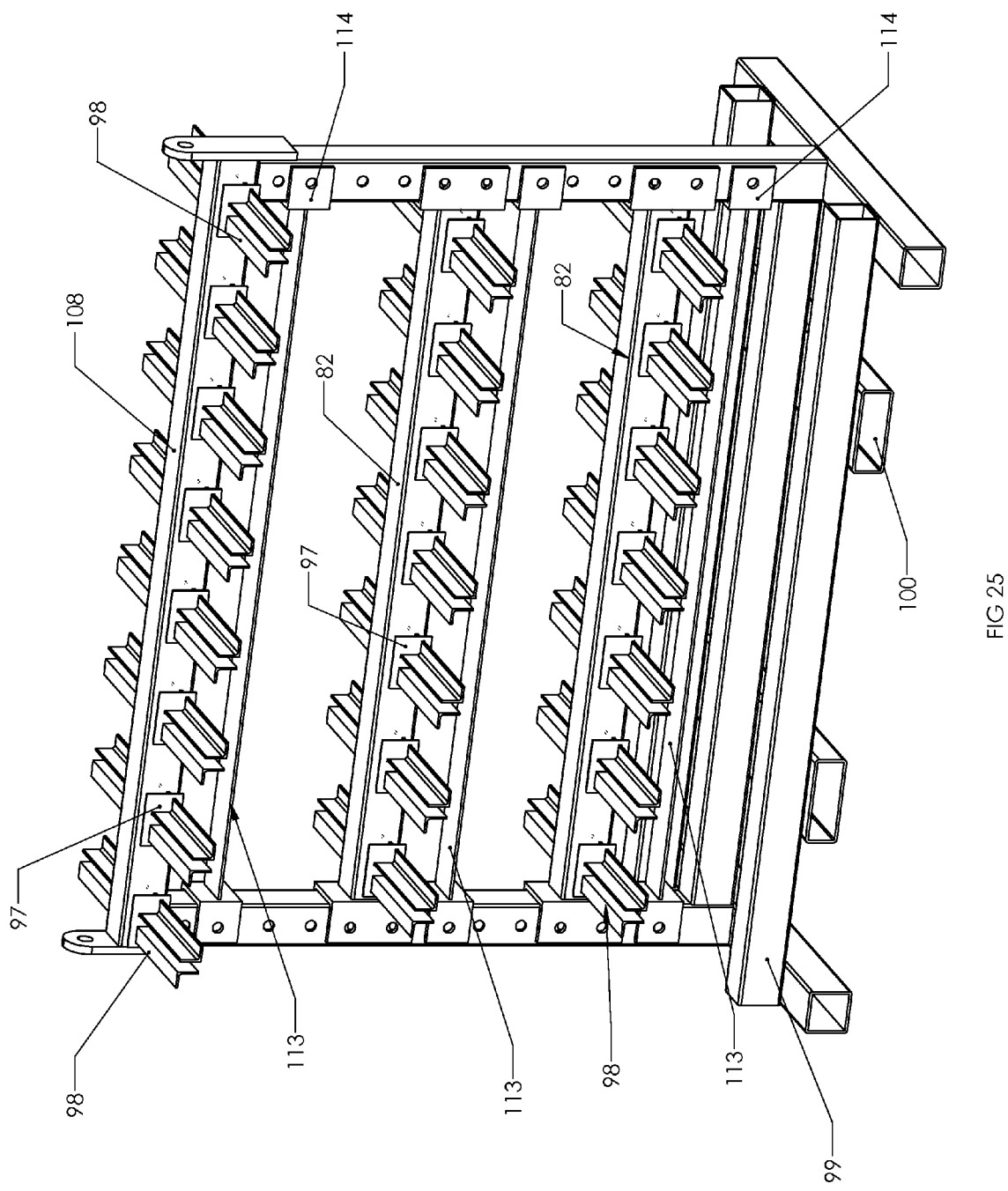

LOCK RACK FOR HYDRO, ISOLATION OR TEST BLINDS

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

Hydro, isolation or test blinds may be used in various industries such as in the petro-chemical industry. The blinds may have painted handles bearing unique colors representing a variety of classifications. The blinds may be stored on a rack.

BRIEF SUMMARY

A blind rack for storing a plurality of blinds has a support frame including a horizontal frame. A plurality of load bearing arms are connected to the horizontal frame, and the plurality of blinds to be stored on the blind rack are indexable with respect to the horizontal frame.

As used herein, the term 'L-shaped' shall be construed to include other shapes such as, but not limited to, T-shaped, U-shaped, etc.

BRIEF DESCRIPTION OF THE DRAWINGS

FIG. 10 depicts an embodiment of a vertically indexing horizontal square tube assembly.
FIG. 10A depicts a side view of the embodiment shown in FIG. 10.
FIG. 10B depicts an enlarged view taken from FIG. 10a.
FIG. 14 depicts a perspective view of an indexable plate with retainer device.
FIG. 14A depicts a right-side view of the embodiment shown in FIG. 14.
FIG. 14B depicts a left-side view of the embodiment shown in FIG. 14.
FIG. 18 depicts a perspective view of an embodiment of a horizontal square tube with L shaped slots.
FIG. 18A depicts a front view of the embodiment shown in FIG. 18.
FIG. 18B depicts another enlarged perspective view of the embodiment shown in FIG. 18.
FIG. 20A depicts an enlarged view taken from the embodiment shown in FIG. 20.
FIG. 20B depicts a side view in cross section of the embodiment shown in FIG. 20.
FIG. 25 depicts a perspective view of another embodiment of a blind rack with three levels of horizontal frames.

DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
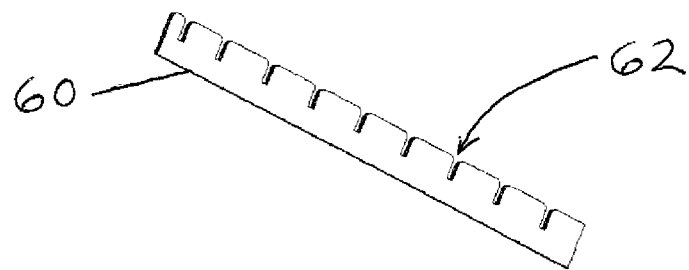
FIG. 1 depicts an embodiment of an indexing plate.

FIG. 1 shows an indexing plate 60. The indexing plate 60 has one or more (preferably a plurality) of indexing slots or holes 62 (for retention of a locking device 40) along one side of the indexing plate 60.

Figure 2:
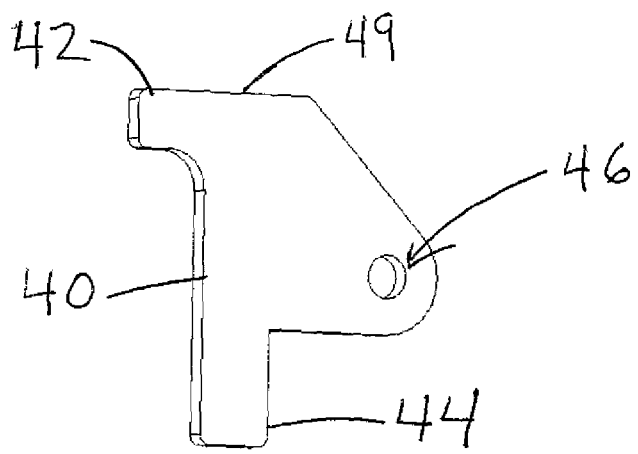
FIG. 2 depicts an embodiment of a locking device.

FIG. 2 shows a locking device 40. The locking device 40 in the embodiment shown includes a first panhandle portion 42 and a second panhandle portion 44. The first panhandle portion 42 functions as a toggle. The second panhandle portion 44 functions as a keeper (when moved within slot 62). The locking device 40 also has a hole 46 through the locking device 40 which functions as a connection or pivot point when the locking device 40 is connected to a retainer body 50.

Figure 3:
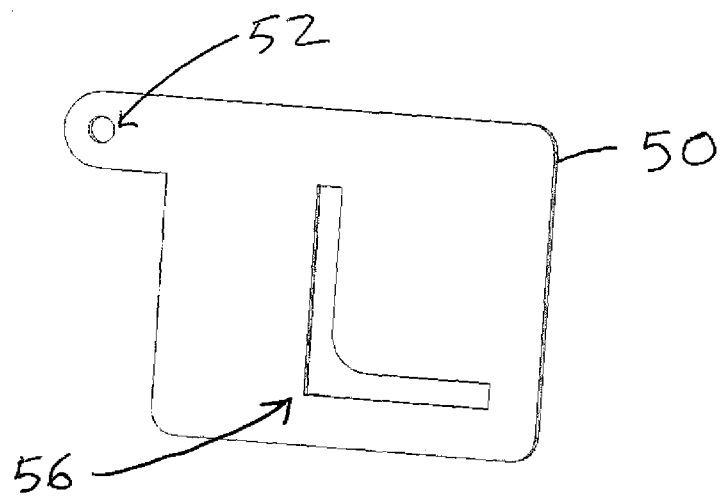
FIG. 3 depicts an embodiment of a retainer.

FIG. 3 shows a retainer body 50. The retainer body 50 is configured to travel as discussed below. The retainer body 50 has a hole 52 there-through. The hole 52 functions as a connection or pivot point when the locking device 40 is connected to a retainer body 50 (e.g. by a pin, rivet, bolt, wire, twine, pliable strip, string or some other fastener). The retainer body 50 also has a slot 56. In the embodiment shown the slot 56 is "L"-shaped (other shaped slots may be implemented) having sufficient clearance to accept a load bearing arm 74. Pin 72 (pin 72 being affixed to the load bearing arm 74) stops or impedes the retainer body 50 from being removed from the load bearing arm 74.

Figure 4:
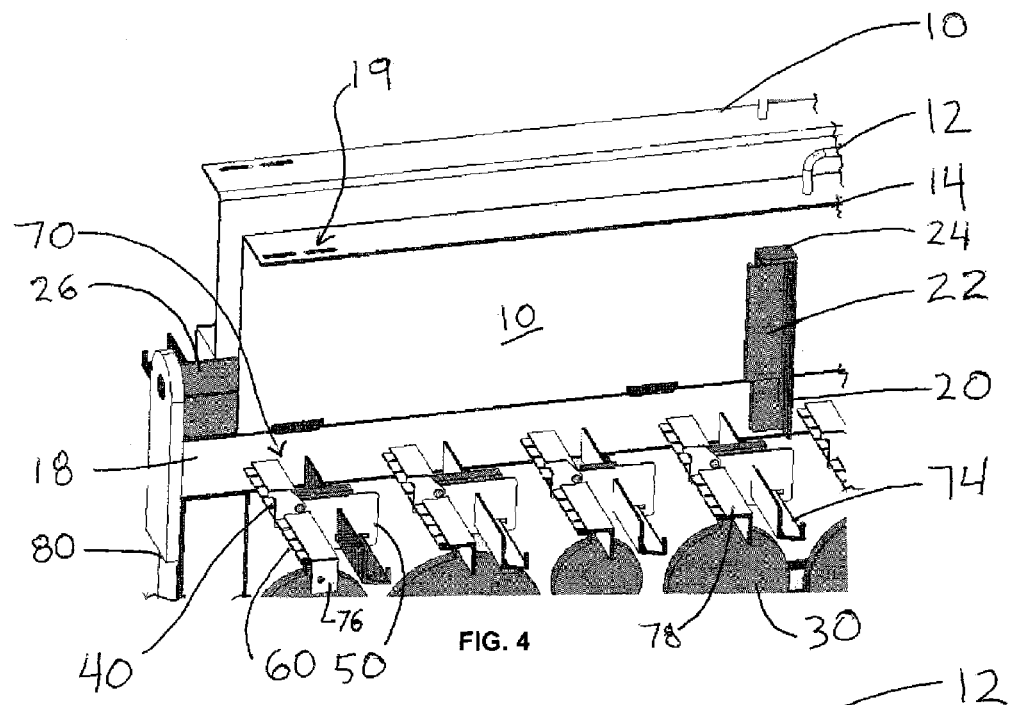
FIG. 4 depicts a perspective view of the rack, blinds and system described according to an embodiment.

Referring to FIG. 4, one exemplary embodiment of an auto-locking mechanism 21 for keeping the door 10 open is shown in the form of a sleeve 22 which is attached (e.g. welded) to the door 10 and latch 20 is slidable within sleeve 22. The latch 20 has a cap 24 to maintain the latch 20 in the sleeve 22. When the door 10 is raised and rotated upward the weight of the latch 20 will cause the latch 20 to fall freely by gravity within sleeve 22 to the position shown. These actions along with the gussets or square tubing 26 on the side cause the rotational movement of door 10 to be restricted or causes the door 10 to remain open.

Figure 5:
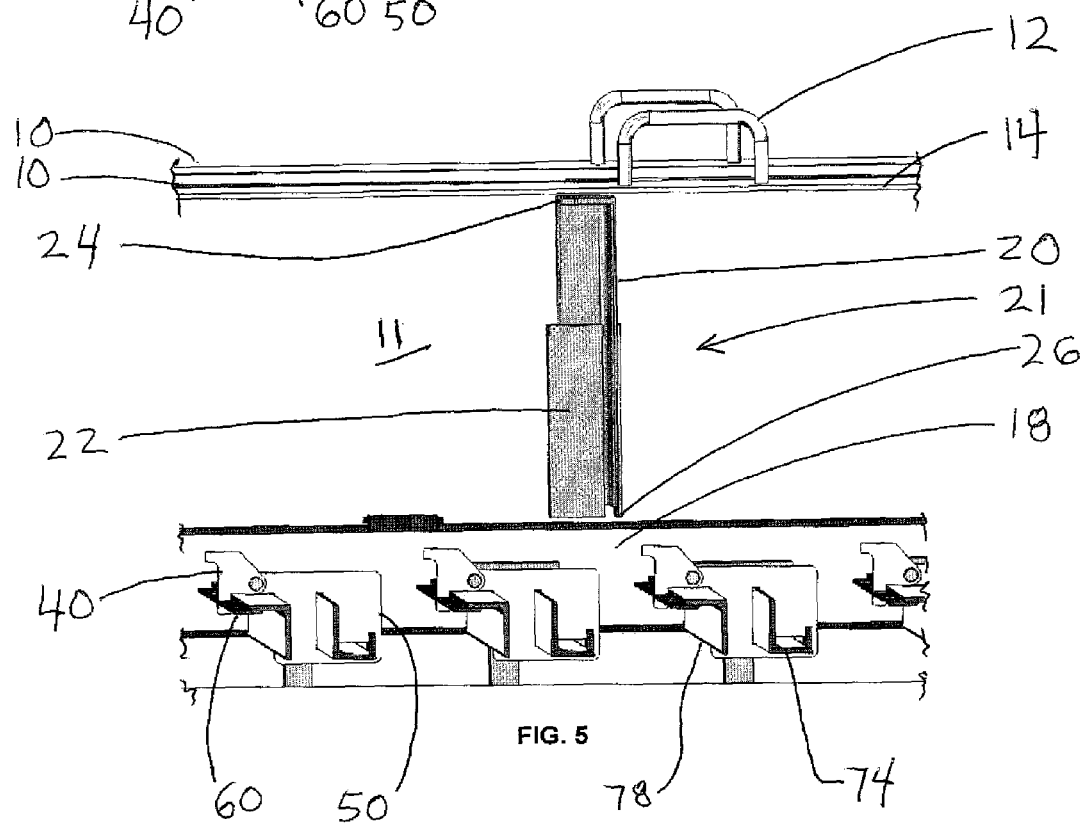
FIG. 5 depicts a perspective view of the rack, blinds and system described according to an embodiment.

Referring to FIG. 5, an operator (not shown) may place one hand securely on the door handle 12, with the free hand raise the latch 20 to the top flange 14 on the door 10. At this position the latch 20 clears frame or horizontal frame 18 and the door 10 can rotate downward until the underside 11 of the door 10 rests on the locking devices 40. Accordingly, the door 10 can be selectively opened and closed. Further, the door can be selectively removed which is inclusive of opening but it further inclusive of physically detaching the door 10 from the blind rack 70 or support frame 71.

Figure 6:
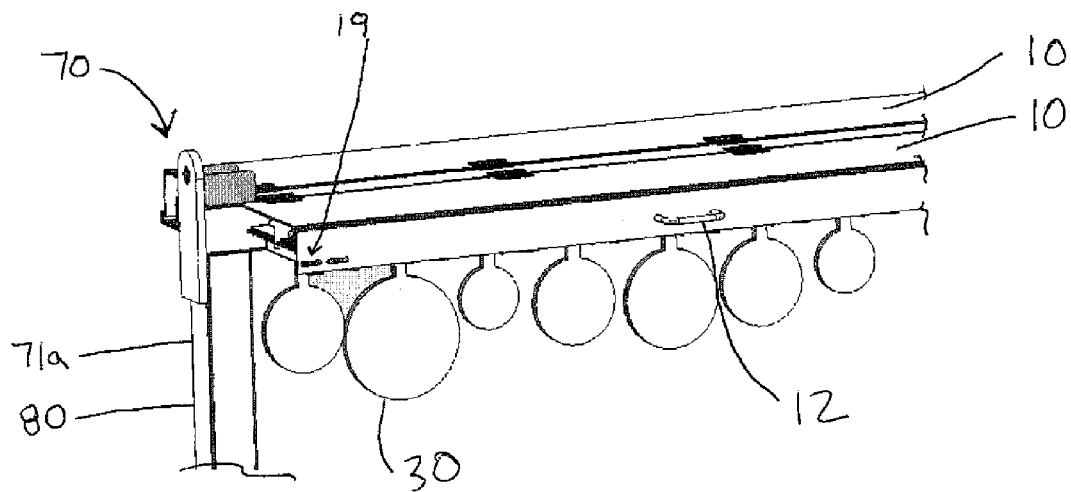
FIG. 6 depicts a perspective view of the rack, blinds and system described according to an embodiment.
Figure 9:
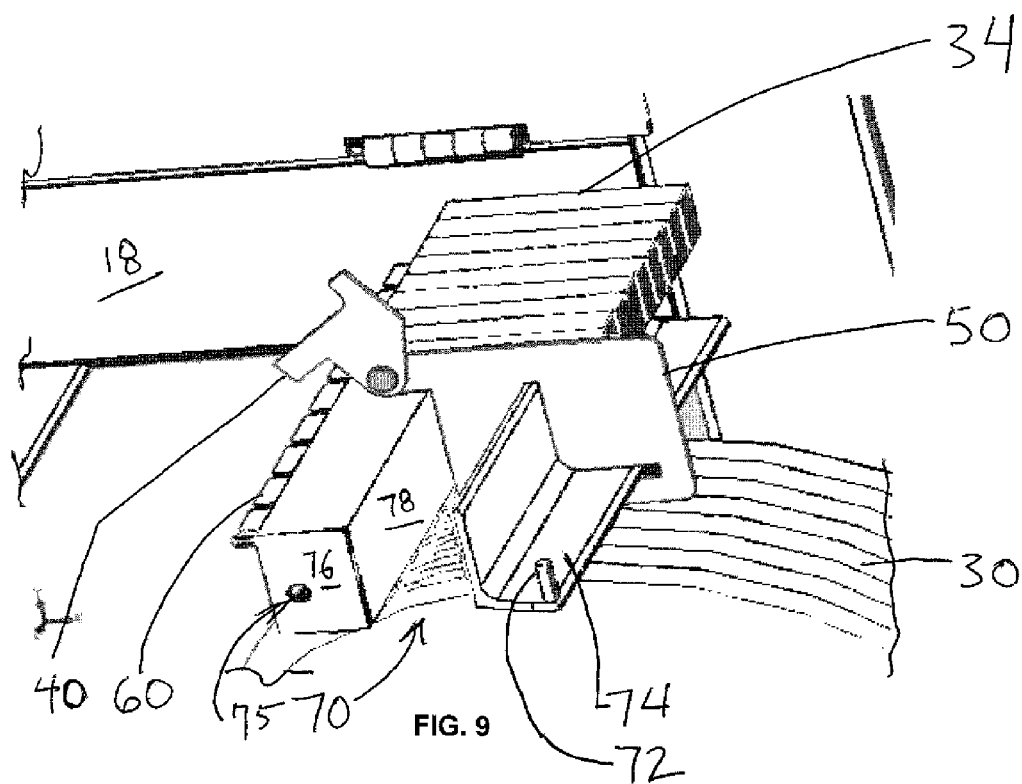
FIG. 9 depicts a perspective view of the rack, blinds and system described according to an embodiment.

Referring to FIG. 6, when the door 10 is closed rotation of the retention locking device 40 is restricted due to interference between the underside 11 of door 10 and the top edge 49 (see FIG. 2) of the locking device 40. The blinds 30 are locked in place and cannot be removed from the blind rack 70 having support frame 71 with-out removing the pad-lock (not shown but engaging the door 10 through an aperture 19 and engaging the endplate 76 through hole 75 in the other or second load bearing arm 78 as represented in FIG. 9) or other known locking device and rotating the locking device 40 out of the indexing slot 62. In other words, the door 10 is fully closed and blinds 30 are securely locked.

Figure 7:
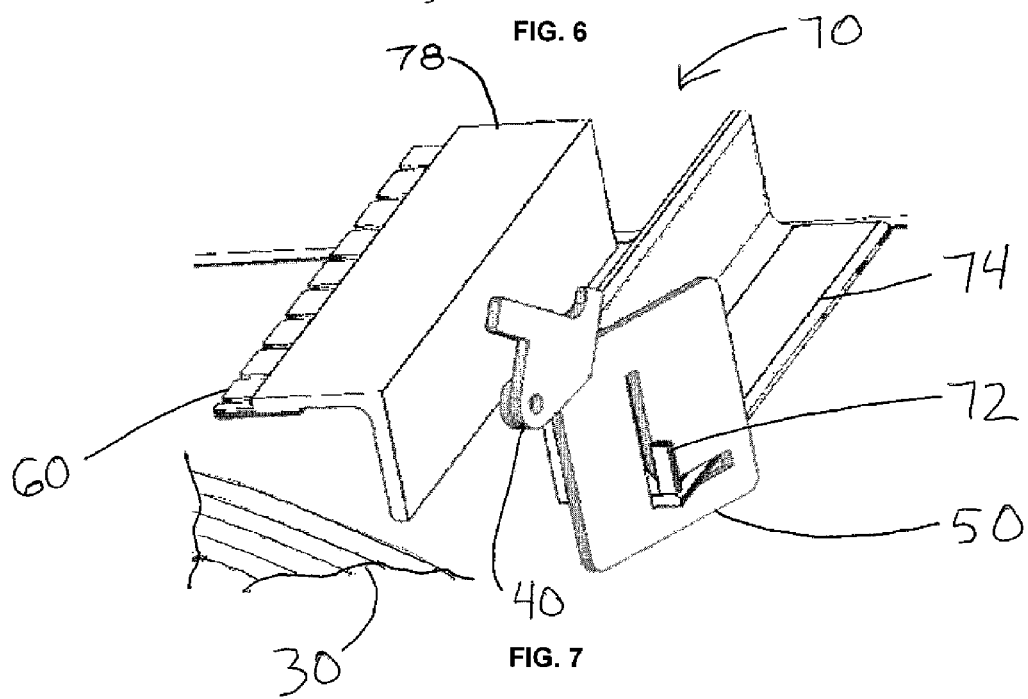
FIG. 7 depicts a perspective view of the rack, blinds and system described according to an embodiment.
Figure 8:
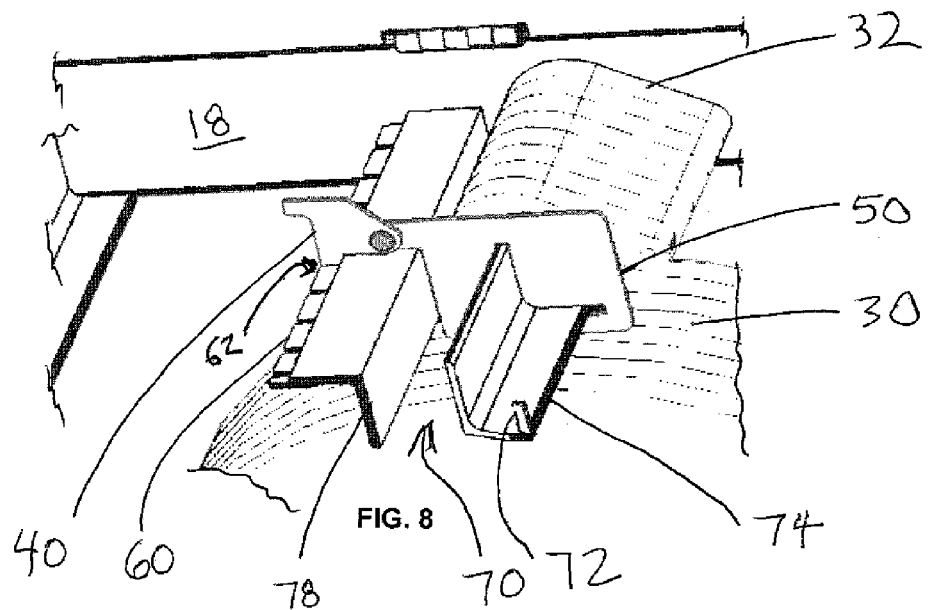
FIG. 8 depicts a perspective view of the rack, blinds and system described according to an embodiment.

Referring to FIG. 7-9, the locking device 40 in various operating positions (for installing the blinds 30) interacting with the indexing plate 60 and retainer body 50 is shown.

Referring to FIG. 7 to place a blind 30 on to rack or blind rack 70 (note that the rack 70 may include both load bearing arm 74 and the other or second load bearing arm 78), the retainer body 50 is represented moving to a position as to allow free travel of the blinds 30 onto the rack 70. Note the locking device 40 is rotated to a desired unlatched position. The pin 72 (vertical in the embodiment shown) restricts or inhibits the operator from removing the retainer body 50. The pin 72 may be replaced by a hole used in combination with a cotter-key, by a threaded piece, an NPT thread, or a spring-roll pin.

Referring to FIG. 8, next the retainer body 50 is positioned and pushed as far back as possible (or as selected) on the rack 70 so as to bind or restrict the travel of the blinds 30. Then, the locking device 40 is rotated to the nearest slot 62 in the indexing plate 60. The blinds 30 are now secured. In FIG. 8, blinds 30 having a "7"-handle 32 are represented.

Referring to FIG. 9 for removing the blinds 30, the locking device 40 is represented as lifted out of the slot 62 and rotated. This movement frees the retainer body 50. Moving the retainer body 50 to the end of the load bearing arm 74 (the load bearing arm 74 may comprise a piece of angle iron, or other shaped weight bearing piece having a shape to match slot 56, or the slot 56 having a shape to accept the other shaped weight bearing piece) and pivoting it on the pin 72 allows full removal of the blinds 30. In FIG. 9, blinds 30 having a "T"-handle 34 are represented.

FIGS. 10, 10A and 10B show another embodiment of a blind rack assembly 81 of a vertically indexing horizontal tube (or horizontal frame) 82 with vertical square tubes (or vertical tubes or members) 80. The holes on the vertical tubing are provided for vertical indexing of the horizontal square tube 82. The support bar 113 is in place to prevent the blinds 30 hanging from the load bearing arms 85 from swaying especially during transportation of the rack 70. The support bar 113 is also vertically indexable through the use of a bracket 114.

Figure 11:
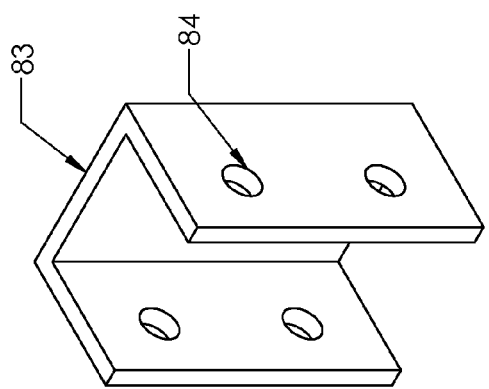
FIG. 11 depicts a perspective view of an embodiment of an indexable pin retainer bracket.
Figure 11A:
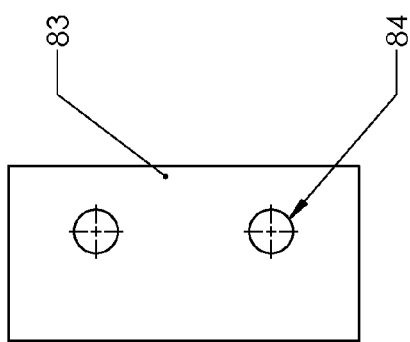
FIG. 11A depicts a side view of the embodiment shown in FIG. 11.
Figure 11B:
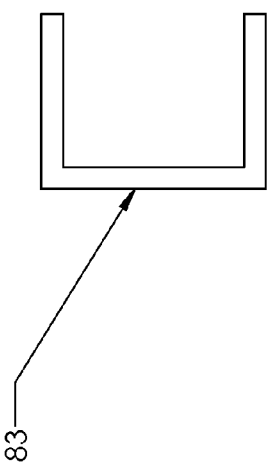
FIG. 11B depicts a bottom view of the embodiment shown in FIG. 11.

FIGS. 11, 11A and 11B refer to an indexable pin retainer bracket 83 which are fixed to the horizontal tube 82. Retainer bracket 83 is to be fastened or fixed onto horizontal square tube 82 which helps in adjusting the height of the beam of the vertical indexing of the horizontal square tube 82 to allow for different rack 70 configurations. Horizontal square tube 82 is affixed to vertical square tubes 80 through the use of a fastener, such as, by way of example only, a bolt or a solid metal pin (not shown). When the user reaches a desired height by vertically indexing the horizontal tube 82, the metal pin is inserted through successive holes 84 on vertical square tubes 80 and retainer bracket 83, which fastens or holds the whole assembly 81 in place.

Figure 20:
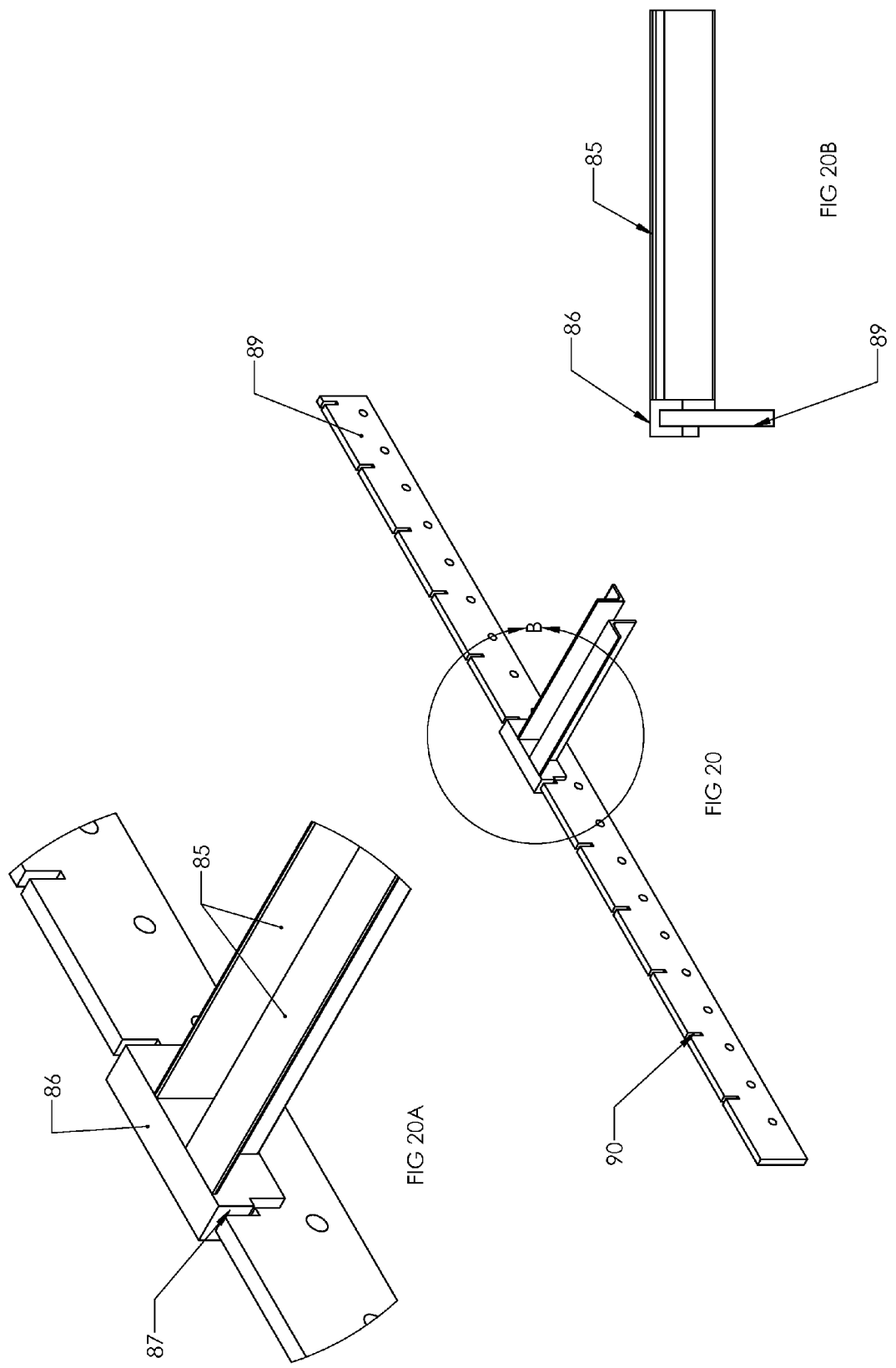
FIG. 20 depicts a perspective view of an embodiment of an assembly of load bearing arms fixed to an indexable plate.
Figure 21:
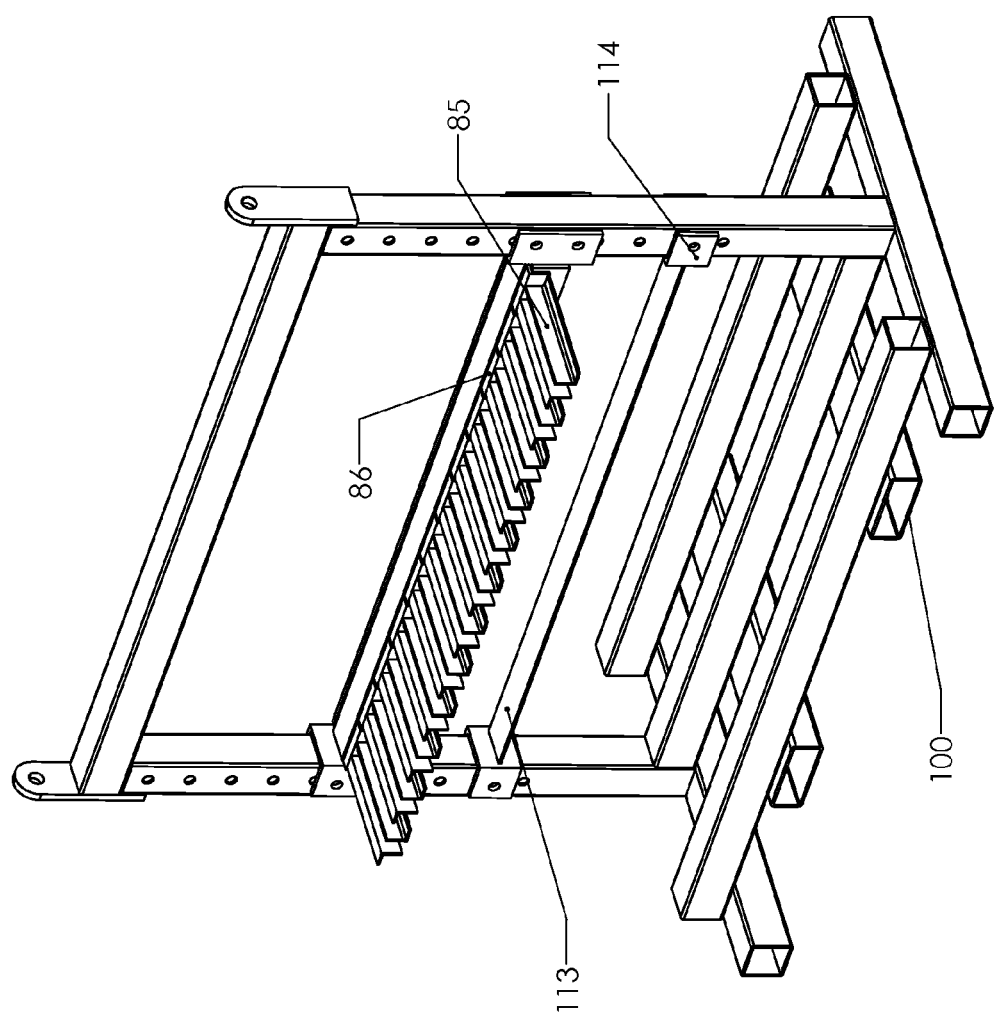
FIG. 21 depicts a perspective view of the rack, assembly of load bearing arms fixed to an indexable plate.

FIGS. 12, 12A, 12B, 12C and 12D refer to a load bearing arm 85 welded on an indexable plate with retainer device or key 86. Indexable plate with a retainer key 86 has a groove 88 running along its width, which sits on top of the support bar 89 (see FIG. 20). Indexable plate with a retainer key 86 also has a small square retainer key part 87.

Figure 12D:
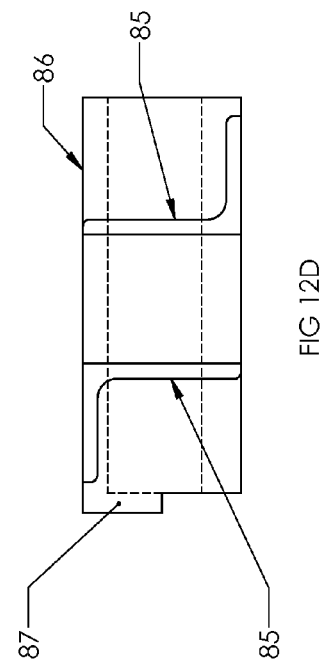
FIG. 12D depicts an end view of the embodiment shown in FIG. 12.
Figure 12:
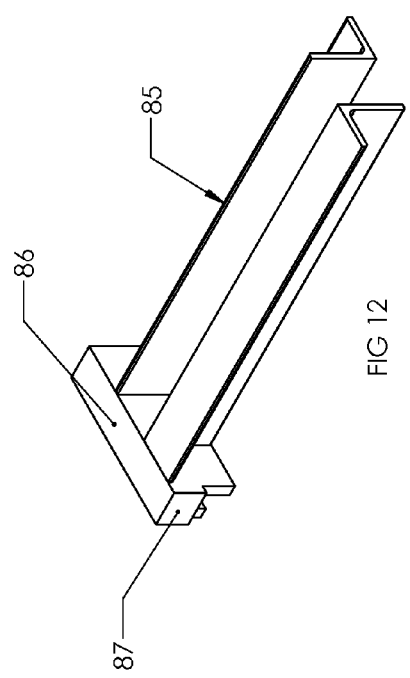
FIG. 12 depicts a perspective view of an embodiment of an assembly of load bearing arms fixed to an indexable plate.
Figure 12A:
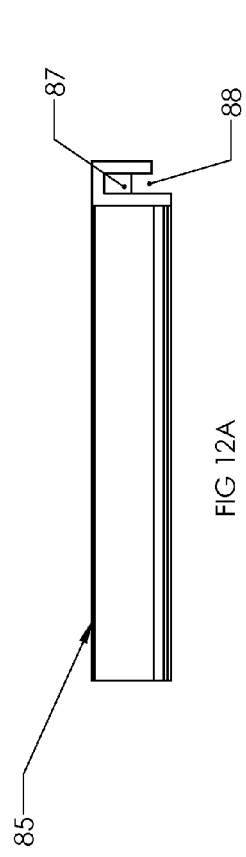
FIG. 12A depicts a side view of the embodiment shown in FIG. 12.
Figure 12B:
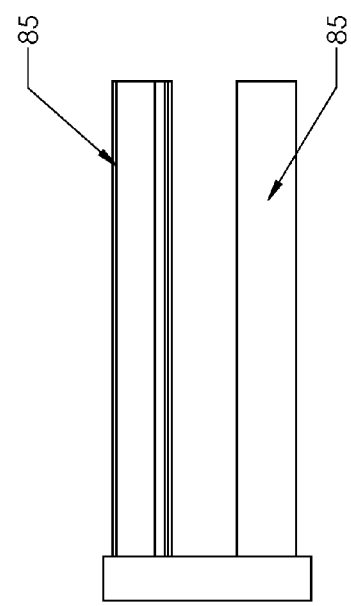
FIG. 12B depicts a top view of the embodiment shown in FIG. 12.
Figure 12C:
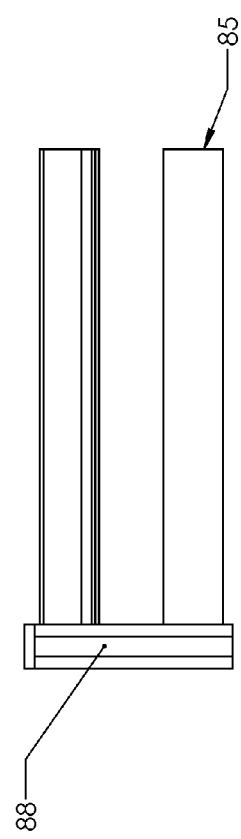
FIG. 12C depicts a bottom view of the embodiment shown in FIG. 12.
Figure 13A:
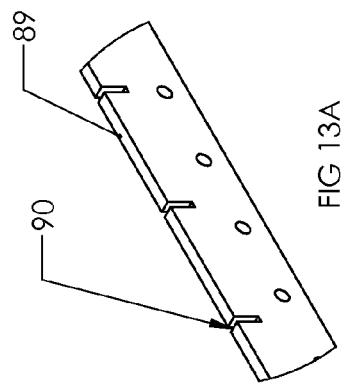
FIG. 13A depicts an enlarged view taken from FIG. 13.
Figure 13:
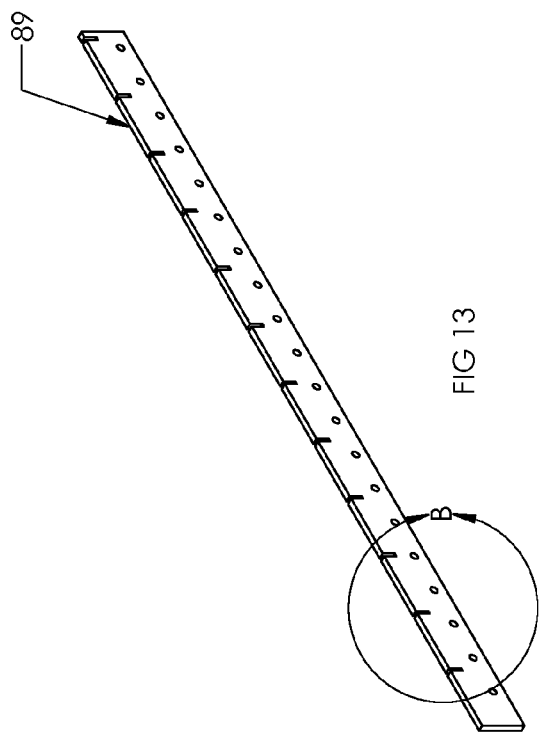
FIG. 13 depicts a perspective view of an embodiment of a support bar with index grooves.
Figure 13B:
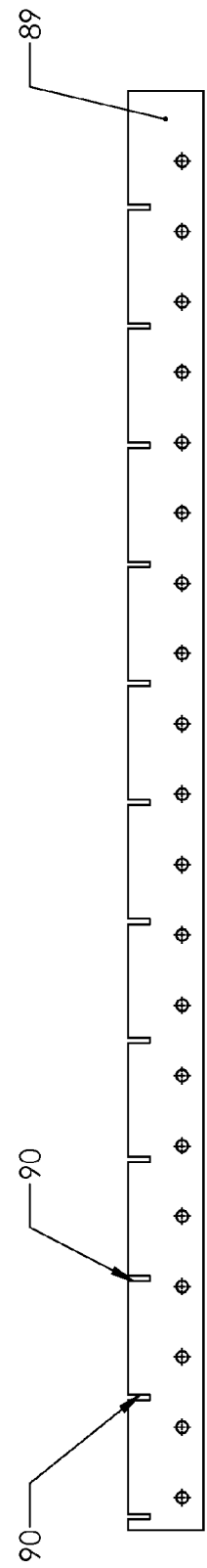
FIG. 13B depicts a front view of the embodiment shown in FIG. 13.

FIG. 13 refers to the support bar 89 with indexing grooves 90. Support bar 89 may be spot welded, plug welded or otherwise joined to the horizontal square tube 82 (see FIG. 10) and the indexing grooves 90 to allow a gap or space to hang and align the indexable plate with retainer device 86 (see FIGS. 12 and 20) and more specifically with the small square retainer part or key 87.

FIG. 14 refers to an indexable plate with retainer device 86 and a small square retainer part 87 which essentially fits into the indexing grooves 90 provided on the support bar 89. Retainer part 87 restricts the motion of the load bearing arms 85 fixed to an indexable plate with retainer device 86.

Figure 15:
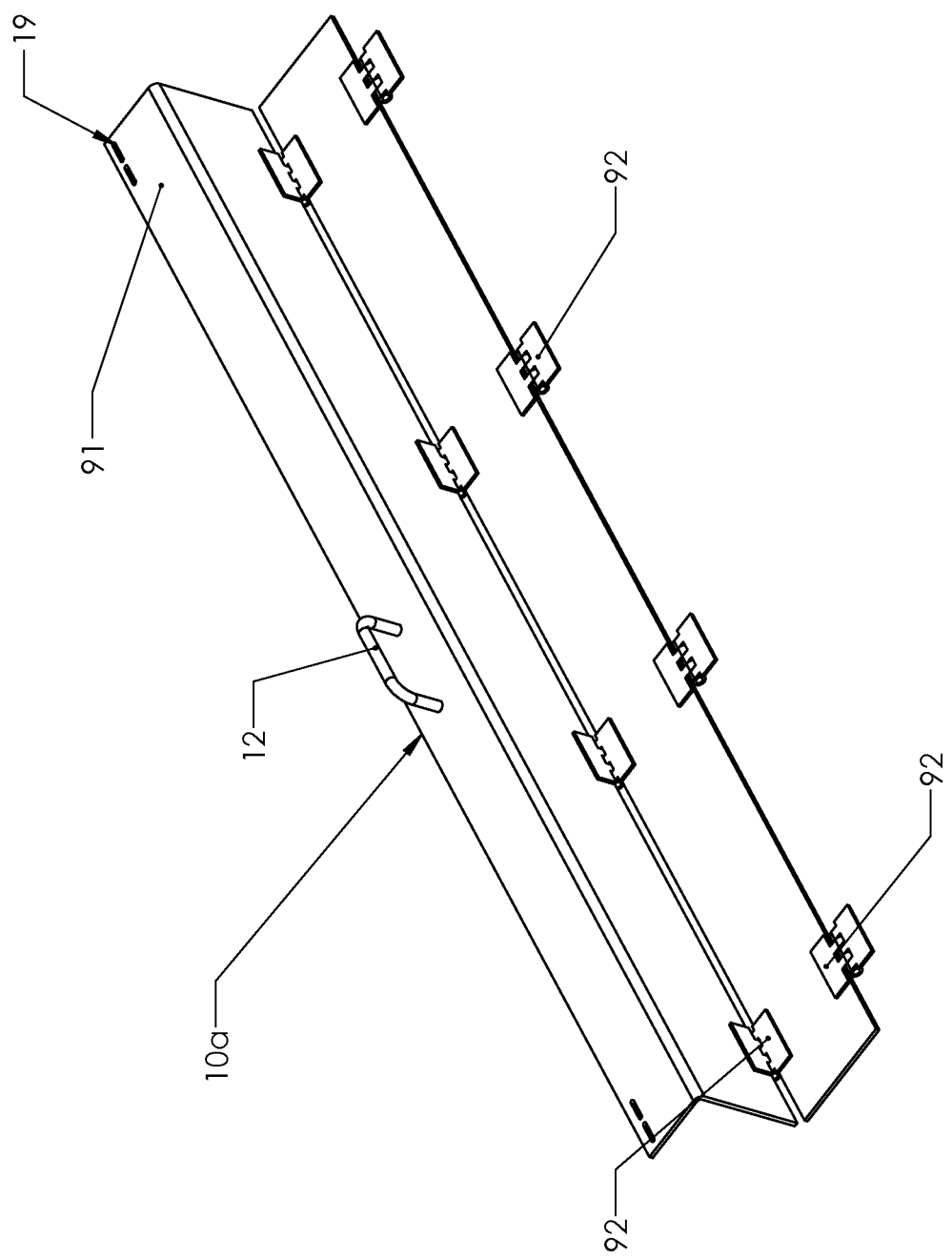
FIG. 15 depicts an embodiment of a double hinged door.

FIG. 15 shows a double hinged door assembly 10a having door plates 91 and hinges 92. The double hinged door assembly 10a is provided to prevent the rotation of the retention locking device 40 (see FIG. 5). The double hinge 92 design is such that the door plate 91 folds back at the hinge 92 point which prevents the door plate 91 from hitting the blinds 30 hanging from the beam of the vertical indexing of the horizontal square tube 82 when the door plate 91 is raised.

Figure 16:
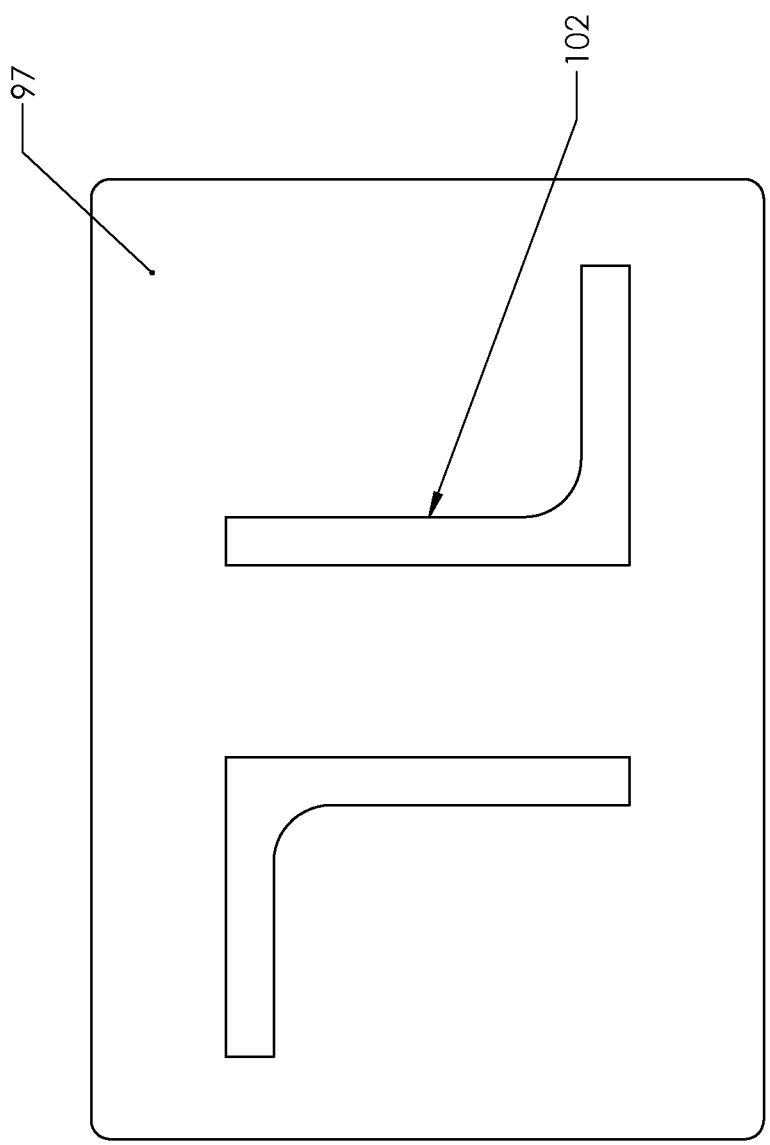
FIG. 16 depicts an embodiment of a collating plate with L-shaped slots.

FIG. 16 refers to a collating plate 97 with L-shaped slots 102. The load bearing angle arms 85 are inserted through the L-shaped slots 102. The function of the collating plate 97 is to correctly position the load bearing arms 98 when installed into the vertically indexing horizontal square tube 82 (see FIG. 18).

Figure 17:
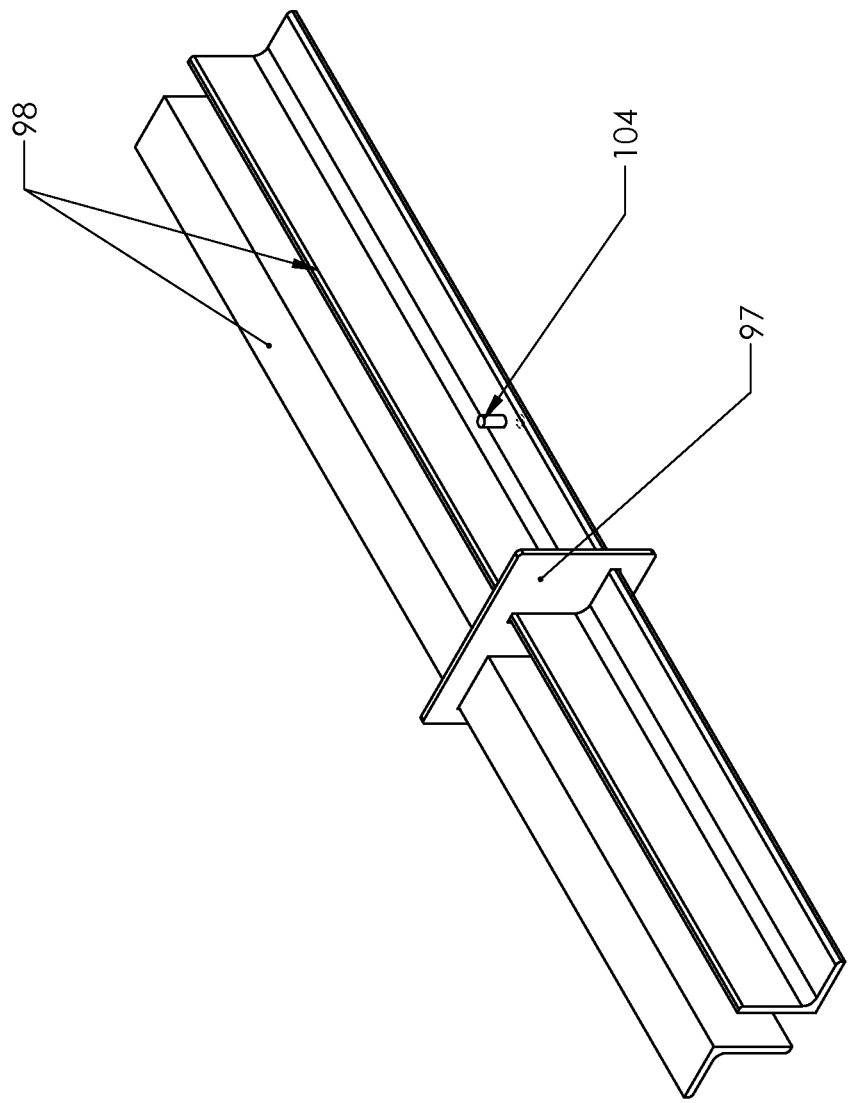
FIGS. 17 and 17A depict a perspective view of an embodiment of a pair of load bearing arms with collating plate and a retainer pin.
Figure 17A:
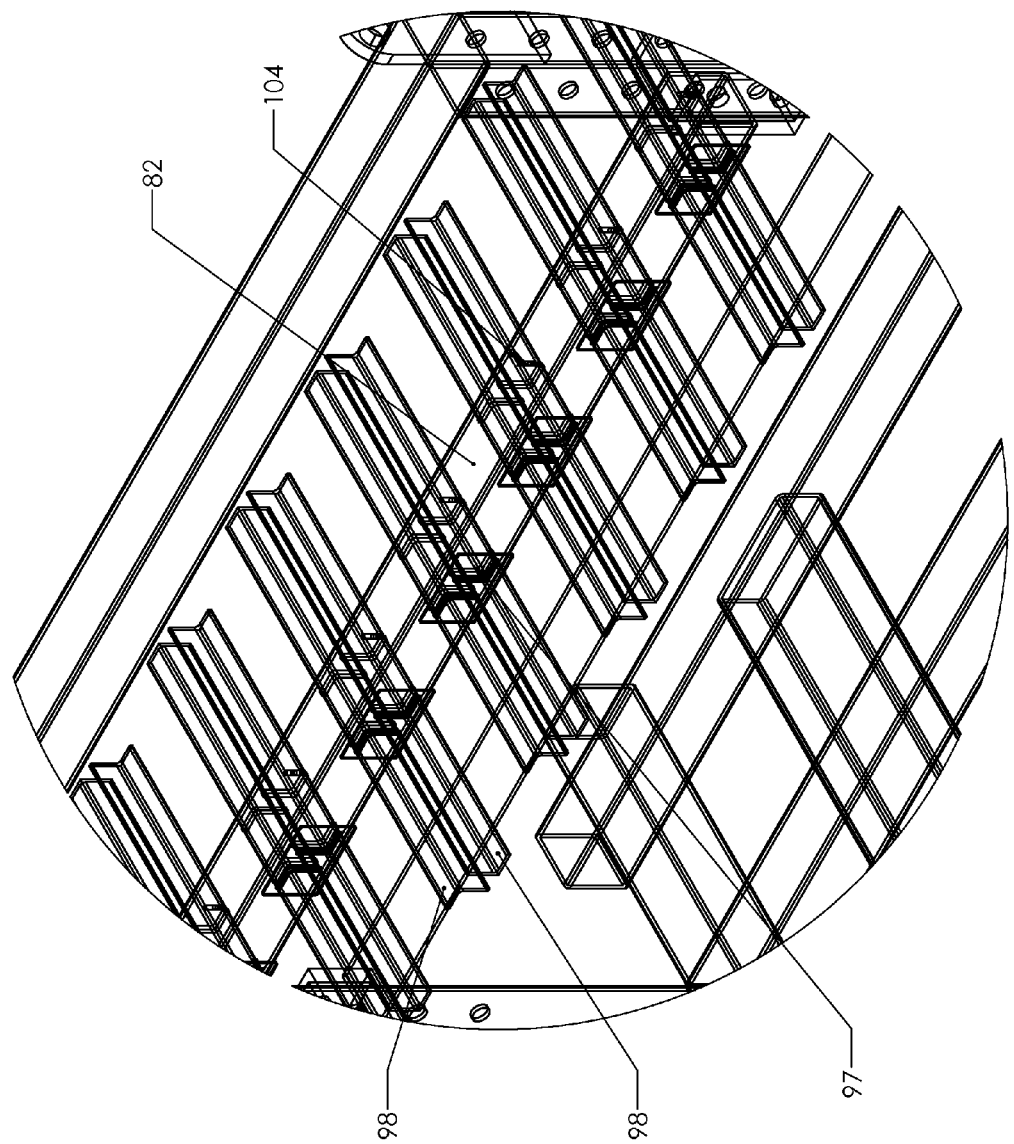

FIGS. 17 & 17A provides a view of another type load bearing arm 98 and the collating plate 97 assembly. The another type load bearing arm 98 are inserted through the slots 102 on the collating plate 97 and fixed in position. This assembly (represented in FIG. 17) is then inserted into the L-shaped slots on the vertically indexing horizontal tube 82 (FIG. 18). The collating plate 97 sits against the vertically indexing horizontal tube 82 and from the side opposite to the collating plate 97 a pin 104 is inserted through the load bearing arm 98 which locks the whole assembly in place. The another type load bearing arms 98 may be moved toward or away from the vertically indexing horizontal tube 82 as desired or removed/deleted as desired.

FIGS. 18, 18A and 18B refers to a vertically indexing horizontal tube 82 defining L shaped slots 111 on its body. This vertically indexing horizontal tube 82 could be fixed to the indexable pin retainer bracket 83 (see FIGS. 10 & 11) for vertical indexing. The load bearing arms 98 can be inserted through the L shaped slots 111.

Figure 19:
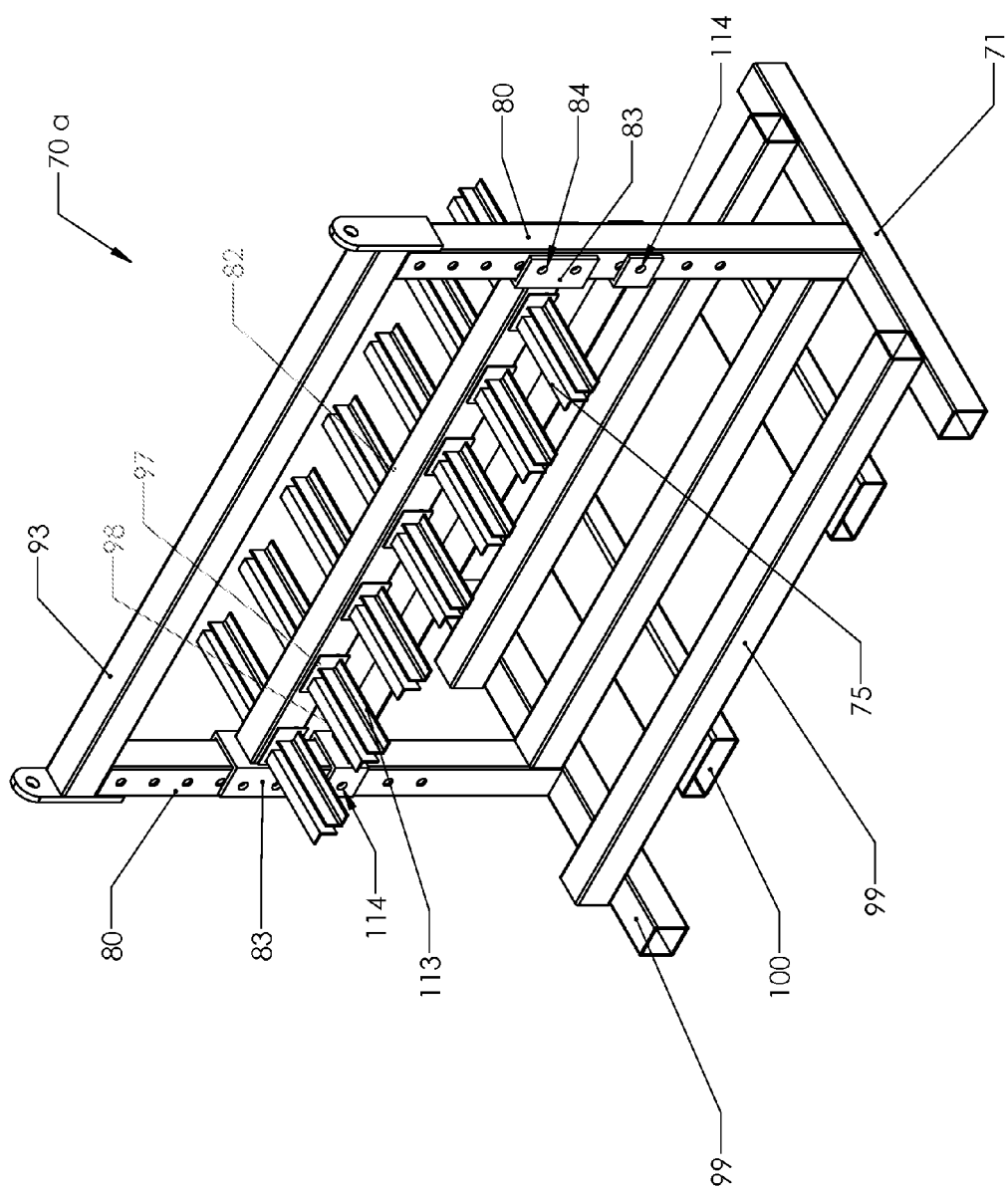
FIG. 19 depicts a perspective view of a full assembly of the rack with removable load bearing arms and horizontal square tube with slots.

FIG. 19 depicts a blind rack 70a having a support frame/framework 71 and having the collating plate 97/load bearing arm 98 assembly (FIG. 17), vertically indexing horizontal square tube 82 (FIG. 18) and support bar 113 (FIG. 10/item 113). The purpose of having the vertically indexable horizontal square tube 82 is to accommodate larger blinds 30 on the load bearing arms 98. This is done by increasing the clearance between the bottom square tube 99 and vertically indexing horizontal square tube 82. The function of the collating plate 97/load bearing arm 98 assembly (FIG. 17) is to provide desired horizontal area for different blind 30 sizes. The collating plate 97/load bearing arm 98 assembly (FIG. 17) can removed and relocated according to the required blind 30 sizes along the vertically indexing horizontal tube 82 defining L shaped slots 111 (FIG. 18). Another feature in this assembly is the adjustable protective flat bar 113 with indexable pin retainer bracket 114. The scope of this flat bar 113 is to prevent the blinds 30 hanging from the load bearing arms 98 from swaying during transportation of the rack 70a. Fork lift lugs 100 in the form of rectangular tubes may be included to lift the rack assembly. The fork lift tubes 100 may be attached to the support tube 99. Two or more levels of blinds 30 (see FIG. 25) may be mounted onto a blind rack 70a by adding additional levels (i.e. more than one) of vertically indexing horizontal square tubes or horizontal frame 82 onto the blind rack 70a including an optional third or top level horizontal frame 108.

FIGS. 20 20A, 20B & 21 shows different views of the load bearing arms 85/indexable plate 86 with retainer key assembly 87 (see FIGS. 12-14). The indexable plate 86 design gives user the option of different rack configurations to accommodate blinds 30 of desired sizes (e.g. for efficiently accommodating wider or narrower blinds 30).

Figure 22:
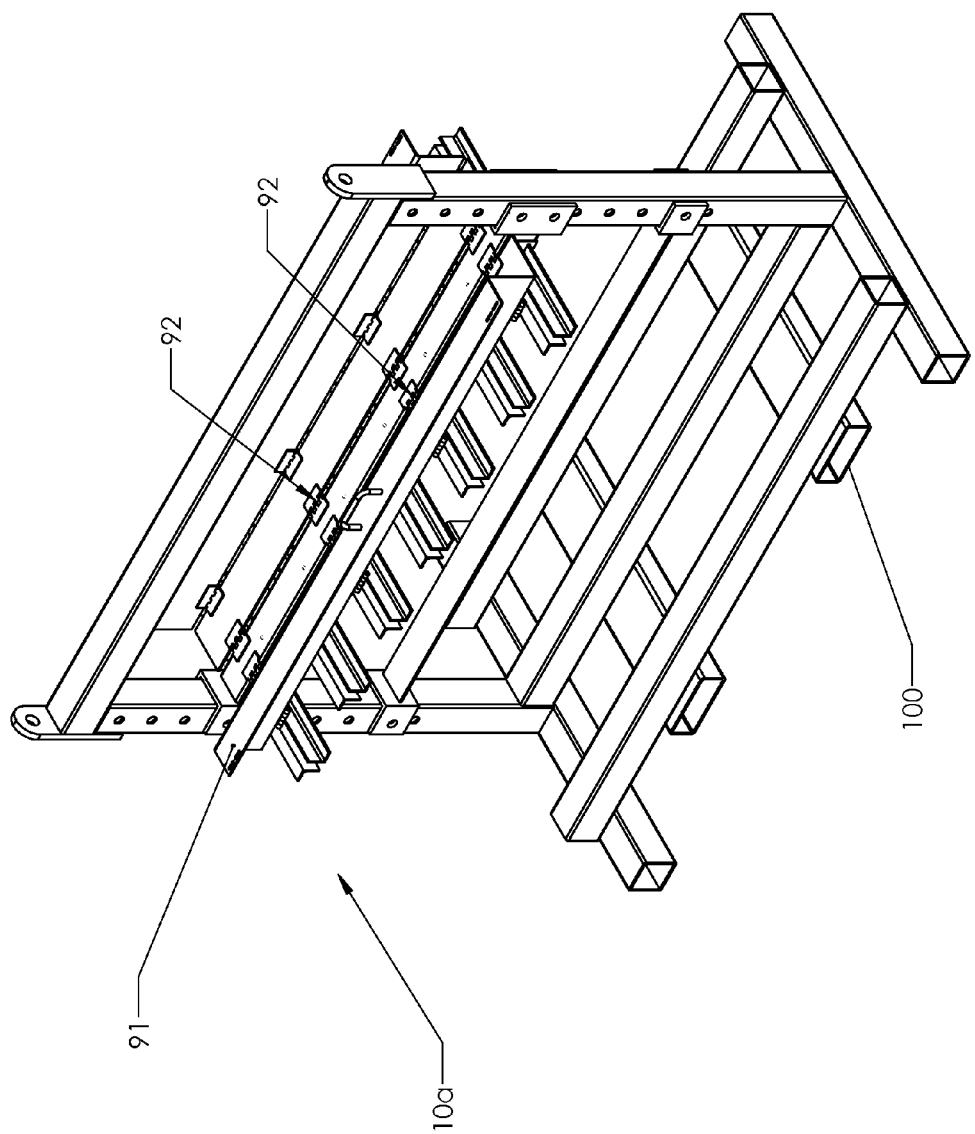
FIG. 22 depicts a perspective view of the rack with the double hinged door assembly.

FIG. 22 shows a perspective view of the blind rack with double hinged doors 10a. The purpose of having hinges 92 on two different points is to fold back the door plate 91 (i.e. outer plate folds back ninety degrees) in such a way that it does not hit the blind 30 installed above it when raised.

Figure 23:
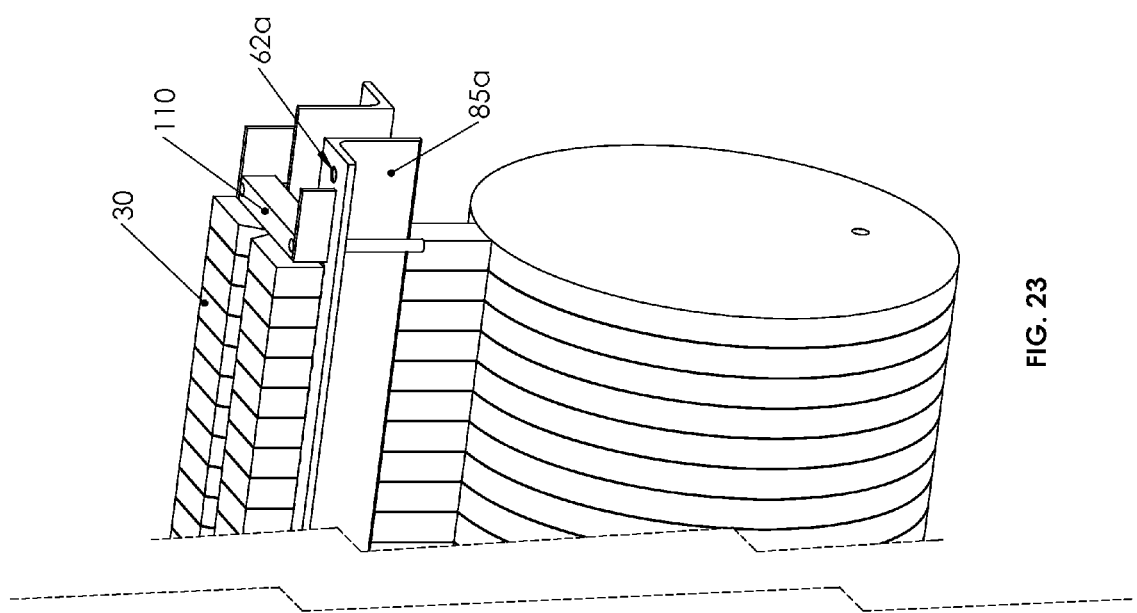
FIG. 23 depicts a perspective view of another embodiment of load bearing arms together with U-shaped or double-pronged removable plate for indexing of the blinds to be stored or removed from the rack.
Figure 24:
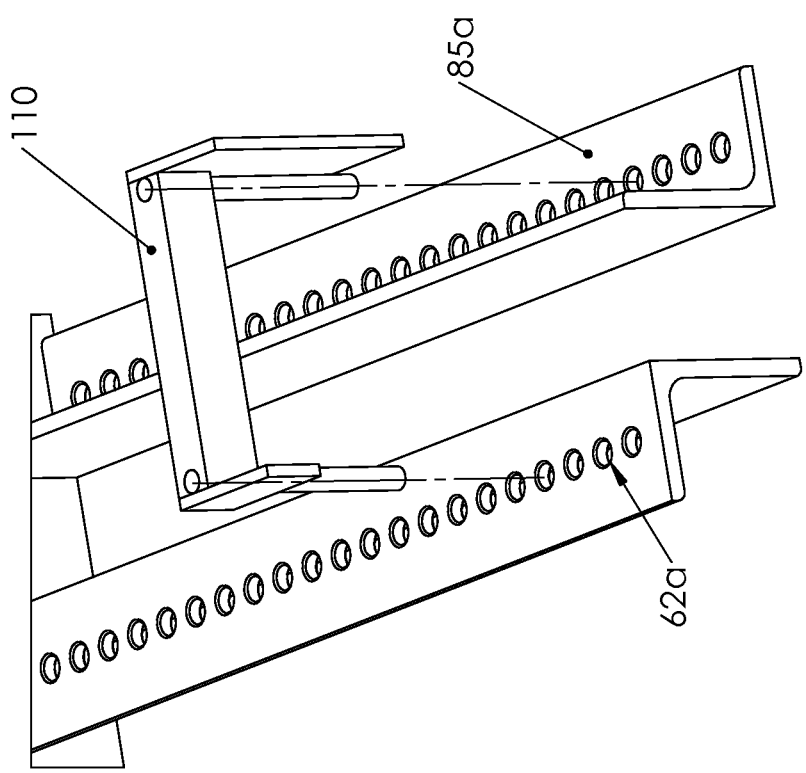
FIG. 24 depicts another perspective view of the embodiment of FIG. 23.

FIGS. 23-24 show another exemplary embodiment of the load bearing arms 85a wherein the both of the load bearing arms 85a have vertical holes 62a through the load bearing arms 85a and running lengthwise along each of the load bearing arms 85a in a matching or corresponding pattern and a U-shaped or double-pronged removable plate (with stability walls) 110 for indexing or dropping into the holes 62a to hold blinds 30 in place.

Different types of blinds 30 may be mounted (for example, FIG. 8 represents a '7-handle' blind 30 and FIG. 9 represents a 'T-handle' blind 30). Any angle iron or tubing may be 'beefed-up' or braced as needed for support and/or stability. The door 10 or double hinged door 10a optionally or may be removed as desired by the user and stored in the vicinity for use when needed. The indexing means of the embodiment(s) of FIGS. 1-9 may be used in combination with any of the other embodiments, and likewise the other embodiments of indexing means may be combined as desired for the end user. All square tubing may be substituted with tubing of other shapes, and all tubing may be substituted with sold bar or the like. Any angle iron may be substituted with other support load bearing bars or formed pieces. While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A blind rack apparatus for storing a plurality of blinds having a support frame including a horizontal frame, comprising:
   a plurality of load bearing arms connected to the horizontal frame;
   a means for indexing the plurality of blinds to be stored on the blind rack and wherein said indexing means is connected to the horizontal frame;
   a retainer body defining a slot which accepts one of the load bearing arms;
   a locking device connected to said retainer body;
   wherein said indexing means comprises an indexing plate connected to at least one of the plurality of load bearing arms, said indexing plate defining a plurality of indexing slots; and
   wherein said locking device is configured to selectively rotate on said retainer body into and out of one of the plurality of indexing slots on said indexing plate.

2. The apparatus according to claim 1 wherein the support frame includes a plurality of vertical tubes; wherein the plurality of vertical tubes define a first set of holes; wherein said indexing means further comprises a plurality of retainer brackets connected to the horizontal frame; and wherein said plurality of retainer brackets define a second set of holes selectively corresponding to and configured for fastening to the first set of holes.

3. The apparatus according to claim 1 wherein said indexing means further comprises an indexable plate with retainer device connected to both the horizontal frame and to the plurality of load bearing arms, and a support bar having a plurality of indexing grooves mounted to the horizontal frame; and wherein the plurality of indexing grooves selectively correspond to and are configured for mounting of said indexable plate with retainer device.

4. The apparatus according to claim 1 wherein said retainer body comprises:
   a first panhandle portion unitary with said retainer body;
   a second panhandle portion unitary with said retainer body; and
   a top edge unitary with said retainer body.

5. The apparatus according to claim 1, further comprising:
   a collating plate having an L-shaped slot for receiving one of the plurality of load bearing arms; and
   wherein said indexing means further comprises the horizontal frame defining a plurality of L-shaped slots configured for receiving, sliding and positioning the load bearing arms toward and away from the support frame.

6. The apparatus according to claim 1, further comprising a door rotationally attached to the support frame.

7. The apparatus according to claim 6, further comprising a means for locking the plurality of blinds on the support frame;
   wherein the means for locking is located in the door and in the support frame.

8. The apparatus according to claim 1, further comprising a second horizontal frame connected to the support frame below the horizontal frame.

9. The apparatus according to claim 1, further comprising a support bar connected to the support frame below the horizontal frame.

10. A blind rack apparatus for storing a plurality of blinds having a support frame including a horizontal frame, comprising:
    a plurality of load bearing arms connected to the horizontal frame;
    a means for indexing the plurality of blinds to be stored on the blind rack and connected to the horizontal frame;
    a door rotationally attached to the support frame; and
    a hinge attached to the door; and a door plate attached to the hinge for rotating about the hinge with respect to the door.

11. The apparatus according to claim 10 further comprising, a means for locking located in the door and configured for automatically locking the door in an open position.

12. A blind rack apparatus for storing a plurality of blinds having a support frame including a horizontal frame, comprising:
    a plurality of load bearing arms connected to the horizontal frame;
    a plurality of vertical tubes;
    wherein the plurality of vertical tubes define a first set of holes;
    a plurality of retainer brackets connected to the horizontal frame;
    wherein said plurality of retainer brackets define a second set of holes selectively corresponding to and configured for fastening to the first set of holes;
    a door rotationally attached to the support frame;
    a hinge attached to the door; and
    a door plate attached to the hinge for rotating about the hinge with respect to the door.

13. The apparatus according to claim 12, further comprising an indexable plate with retainer device connected to both the horizontal frame and to the plurality of load bearing arms, and a support bar having a plurality of indexing grooves mounted to the horizontal frame; and wherein the plurality of indexing grooves selectively correspond to and are configured for mounting of said indexable plate with retainer device.

14. The apparatus according to claim 12, further comprising:
    a retainer body defining a slot which accepts one of the load bearing arms;
    a locking device connected to said retainer body;
    a means for indexing the plurality of blinds to be stored on the blind rack wherein said indexing means comprises an indexing plate connected to at least one of the plurality of load bearing arms, said indexing plate defining a plurality of indexing slots; and
    wherein said locking device is configured to selectively rotate on said retainer body into and out of one of the plurality of indexing slots on said indexing plate.

15. The apparatus according to claim 14, further comprising a second horizontal frame connected to the support frame below the first horizontal frame.

16. The apparatus according to claim 14, further comprising a support bar connected to the support frame below the horizontal frame.

17. The apparatus according to claim 16, further comprising a second horizontal frame connected to the support frame below the first horizontal frame.

18. The apparatus according to claim 12, further comprising:
    wherein the plurality of load bearing arms define vertical holes there-through and running lengthwise along each of the respective plurality of load bearing arms; and
    a U-shaped removable plate for dropping into the vertical holes configured to hold the plurality of blinds in place.

19. The apparatus according to claim 12 further comprising, a means for locking located in the door and configured for automatically locking the door in an open position.

20. A method for using a blind rack for storing a plurality of blinds having a support frame including the step of locking the plurality of blinds on the blind rack with a door, further comprising the steps of:
    selectively raising and lowering a horizontal frame having a plurality of load bearing arms, with respect to a support frame of the blind rack;
    unlocking the door;
    removing the door; and
    accessing the plurality of blinds on the blind rack.

21. The method according to claim 20 further comprising the step of selectively indexing the plurality of load bearing arms horizontally along the horizontal frame.

22. The method according to claim 20 further comprising the step of selectively adding and removing at least one of the plurality of load bearing arms from the blind rack.

23. The method according to claim 20 further comprising the step of automatically locking the door in an open position.

* * * * *